United States Patent

Lyons

[11] Patent Number: 6,110,325
[45] Date of Patent: Aug. 29, 2000

[54] APPARATUS AND METHOD FOR PROCESSING A FEED

[75] Inventor: Martin K. Lyons, Bartlesville, Okla.

[73] Assignee: Krupp UHDE GmbH, Dortmund, Germany

[21] Appl. No.: 08/889,314

[22] Filed: Jul. 8, 1997

[51] Int. Cl.⁷ .............................. B01D 3/42; C10G 7/12
[52] U.S. Cl. .............................. 203/2; 137/455; 202/160; 203/98; 208/134; 208/347; 585/800; 585/914; 585/654
[58] Field of Search ............................ 203/2, 94, 98, 203/100, 1, 99; 202/160, 202; 585/440, 709, 654, 810, 407, 804, 800, 201, 914; 208/106, 133, 141, 184, 134, 142, 347; 137/12, 14, 334, 455

[56] References Cited

U.S. PATENT DOCUMENTS

| | | | |
|---|---|---|---|
| 3,706,814 | 12/1972 | Kirsch et al. | 585/722 |
| 3,792,110 | 2/1974 | Senn, III et al. | 585/659 |
| 3,865,894 | 2/1975 | Kirsch et al. | 585/722 |
| 3,979,183 | 9/1976 | Scott | 203/2 |
| 4,139,573 | 2/1979 | Carson | 585/701 |
| 4,206,035 | 6/1980 | Hutson, Jr. et al. | 208/65 |
| 4,229,602 | 10/1980 | Brinkmeyer et al. | 585/407 |

*Primary Examiner*—Virginia Manoharan
*Attorney, Agent, or Firm*—Marshall & Melhorn

[57] ABSTRACT

An apparatus and method are provided in which a vaporizer vaporizes a liquid feed for introduction to a feed conversion unit such as a steam active reformer. A condenser condenses vaporized feed from the vaporizer when introduction of feed to the feed conversion unit is stopped. Condensed, liquid feed is passed back into the vaporizer and is conserved rather than going to flare.

3 Claims, 2 Drawing Sheets

(a) PASSING A FLOW OF VAPORIZED PARAFFIN FEED FROM VAPORIZER TANK 12 AND THROUGH OPEN VALVE 28 TO STEAM ACTIVE REFORMER 30 WHICH CONVERTS VAPORIZED FEED TO OLEFINS OR AROMATICS.

(b) CLOSING VALVE 28 TO STOP FLOW OF VAPORIZED FEED TO STEAM ACTIVE REFORMER 30.

(c) OPENING OF VALVE 38 IN RESPONSE TO ELEVATION OF PRESSURE OF VAPORIZED FEED IN VAPORIZER TANK 12 TO PREDETERMINED PRESSURE SET POINT, ALLOWING PASSAGE OF VAPORIZED FEED FROM VAPORIZER TANK 12 TO CONDENSER TANK 44.

(d) CONDENSING VAPORIZED FEED IN CONDENSER TANK 44 AND COLLECTING CONDENSED LIQUID FEED IN LOWER PORTION OF CONDENSER TANK 44.

(e) ACCUMULATING CONDENSED, LIQUID FEED IN CONDENSER TANK 44 UNTIL IT REACHES A PREDETERMINED LEVEL, AT WHICH POINT CHECK VALVE 54 OPENS TO ALLOW PASSAGE OF CONDENSED, LIQUID FEED TO VAPORIZER TANK 12.

*FIG. 2*

APPARATUS AND METHOD FOR PROCESSING A FEED

BACKGROUND OF THE INVENTION

This invention relates to an apparatus and method for processing a feed, such as a feed to a steam active reformer.

A vaporized paraffin feed is introduced to the steam active reformer so as to pass over a fixed catalyst bed. Steam is used as a diluent. Paraffins containing five carbon atoms or less in a chain are dehydrogenated to the respective olefin, and paraffins containing six carbon atoms or more in a chain are dehydrocyclized to aromatics. A by-product of the process is coke which deposits on the catalyst. Therefore, the coke must be burned off (regeneration) periodically, during which the flow of vaporized feed to the steam active reformer is stopped. The heating coil in the vaporizer is shut off, but the vaporizer will continue to vaporize liquid paraffin feed. Any generated vapor goes to flare and is wasted.

SUMMARY OF THE INVENTION

It is, therefore, an object of the invention to provide an apparatus and method in which feed is conserved when it is required to stop flow of vaporized feed to a feed conversion unit such as a steam active reformer.

The above object is realized by an apparatus comprising: a vaporizer for vaporizing a liquid feed to a vaporized feed, the vaporizer comprising a vaporizer tank, having a lower portion and an upper portion, for containing the liquid feed in the lower portion and a heating means for heating the liquid feed to thereby produce vaporized feed in the upper portion; a first outlet line in communication with the upper portion of the vaporizer tank; a first valve associated with the first outlet line and having an open position and a closed position; a feed conversion unit for receiving vaporized feed from the first valve in its open position, the feed conversion unit converting the vaporized feed to a desired product; a second outlet line in communication with the upper portion of the vaporizer tank; a second valve associated with the second outlet line and having an open position and a closed position; a condenser comprising a cooling means and a condenser tank having a lower portion and an upper portion, the upper portion of the condenser tank receiving vaporized feed from the open second valve and condensed, liquid feed being collected in the lower portion of the condenser tank; an inlet line for receiving from the lower portion of the condenser tank condensed, liquid feed which flows through the inlet line and into the vaporizer tank.

According to another aspect of the invention, there is provided a method comprising: (a) passing a flow of vaporized feed from a vaporizer tank and through an open first valve to a feed conversion unit which converts the vaporized feed to a desired product; (b) after (a), closing the first valve to stop the flow of vaporized feed to the feed conversion unit; (c) after (b), opening a normally closed second valve to allow passage of vaporized feed from the vaporizer tank, through the second valve, and to a condenser tank; (d) condensing the vaporized feed in the condenser tank to condensed, liquid feed; and (e) passing the condensed, liquid feed from the condenser tank back into the vaporizer tank.

Therefore, the apparatus and method of the invention conserves feed that would otherwise go to flare. In a preferred embodiment, the feed conversion unit is a steam active reformer and the feed is a paraffin.

BRIEF DESCRIPTION OF THE DRAWINGS

FIG. 2 is a flow chart illustrating steps in operating the apparatus of FIG. 1.

DETAILED DESCRIPTION OF THE INVENTION

Figure 1:
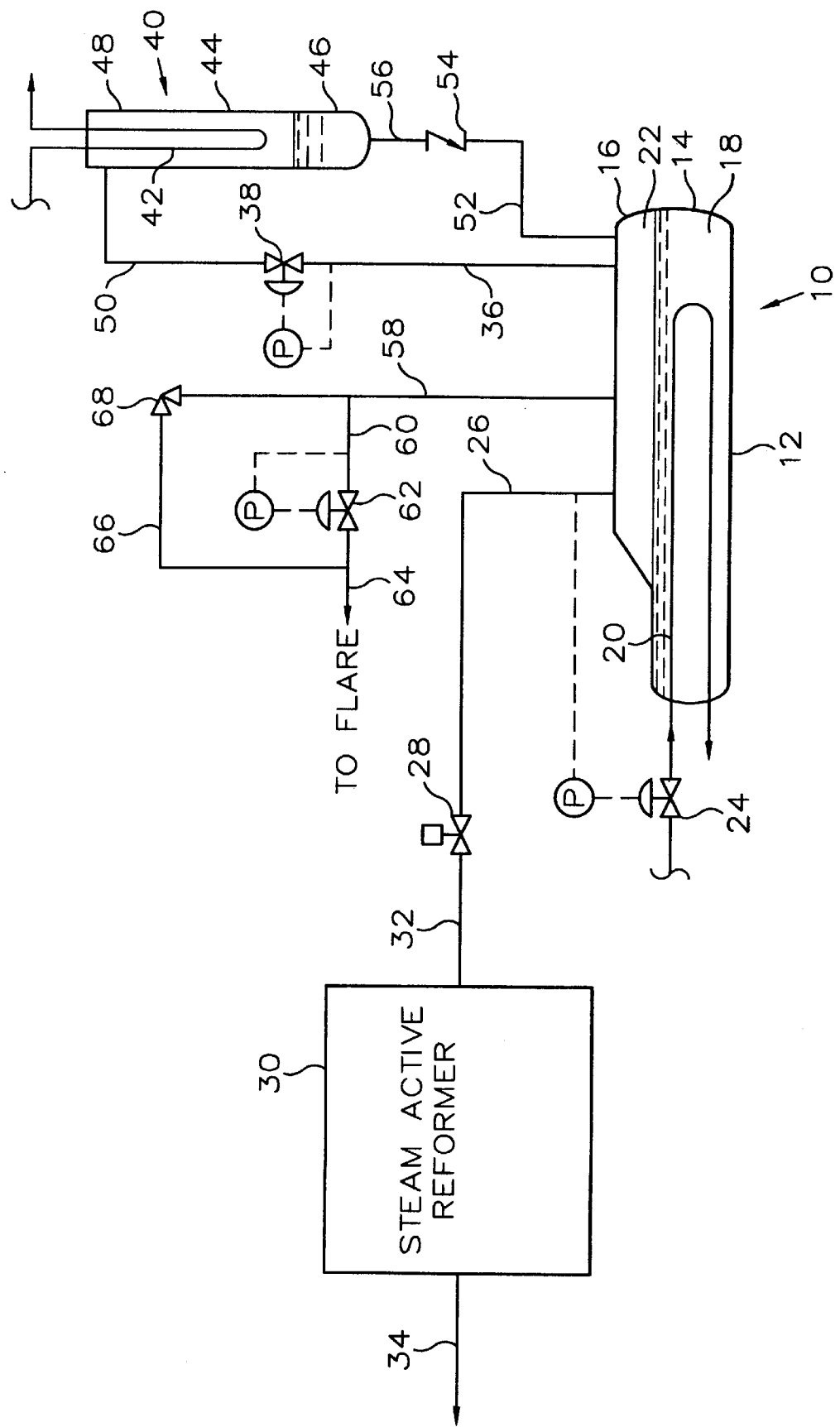
FIG. 1 is a schematic of an apparatus in accordance with the invention.

Referring to FIG. 1, the apparatus includes a vaporizer 10 for vaporizing a liquid feed to a vaporized feed. Vaporizer 10 comprises a vaporizer tank 12, having a lower portion 14 and an upper portion 16, for containing the liquid feed 18 in lower portion 14 and a heating coil 20 for heating the liquid feed to thereby produce vaporized feed 22 in upper portion 16. Valve 24 is associated with heating coil 20 and is pressure controlled as shown to regulate the flow of heat exchange fluid through heating coil 20. A detected pressure meeting or exceeding a predetermined pressure set point closes valve 24.

An outlet line 26 is in communication with the upper portion 16 of vaporizer tank 12, and a valve 28, having an open position and a closed position, is associated with outlet line 26. A steam active reformer 30 receives vaporized feed from valve 28 and through line 32 when valve 28 is in its open position. Steam active reformer 30 converts the vaporized feed to olefins or aromatics, depending upon the paraffin feed employed. Product flows through line 34.

Another outlet line 36 is also in communication with the upper portion 16 of vaporizer tank 12. A valve 38, having an open position and a closed position, is associated with line 36. A condenser 40 comprises a cooling coil 42 and a condenser tank 44 having a lower portion 46 and an upper portion 48. The upper portion 48 of condenser tank 44 receives vaporized feed from the open valve 38 via line 50, and condensed, liquid feed is collected in the lower portion 46 of condenser tank 44. Valve 38 is pressure controlled so that it opens to the open position from a normally closed position after valve 28 is closed to the closed position from a normally open position to cause an elevation of pressure in the upper portion 16 of vaporizer tank 12 to a predetermined pressure set point. An inlet line 52 is in communication with the upper portion 16 of vaporizer tank 12, and a spring loaded check valve 54, having an open position and a closed position, is associated with inlet line 52. Valve 54 opens to the open position from a normally closed position when a predetermined level of condensed, liquid feed is reached in the lower portion 46 of condenser tank 44. Condensed, liquid feed consequently flows through line 56, valve 54, and inlet line 52 into vaporizer tank 12.

Yet another outlet line 58 is in communication with the upper portion 16 of vaporizer tank 12. Line 60 communicates with line 58 and has associated therewith a valve 62. Valve 62 is pressure controlled so that it opens from a normally closed position in response to an elevation of pressure to a predetermined pressure set point. Vaporized feed then flows through line 64 to flare. The pressure set point associated with valve 62 is higher than the pressure set point for valve 38, so that valve 62 will not open in normal operation. Lines 58 and 66 go to a pressure relief valve 68 which will open if pressure meets or exceeds a pressure set point which is higher than the pressure set point for valve 62.

A method of operating the apparatus of FIG. 1 is as follows (see FIG. 2): (a) passing a flow of vaporized paraffin feed from vaporizer tank 12 and through open valve 28 to steam active reformer 30 which converts the vaporized paraffin feed to olefins or aromatics; (b) after (a), closing valve 28 to stop flow of vaporized feed to steam active reformer 30, such as in preparation for regeneration of catalyst; (c) opening of valve 38 in response to an elevation of pressure of the vaporized feed in vaporizer tank 12 to a predetermined pressure set point, thus allowing passage of vaporized feed from vaporizer tank 12, through valve 38, and to condenser tank 44 (generation of vapor continues and elevation of pressure occurs even though valve 24 is closed at this point); (d) condensing the vaporized feed in condenser tank 44 to condensed, liquid feed and collecting the condensed, liquid feed in the lower portion 46 of condenser tank 44; (e) accumulating condensed, liquid feed in condenser tank 44 until it reaches a predetermined level, at which point normally closed check valve 54 opens to allow passage of condensed, liquid feed to vaporizer tank 12.

Obviously, many modifications and variations of the present invention are possible in light of the above teachings. It is, therefore, to be understood that within the scope of the appended claims, the invention may be practiced otherwise than as specifically described.

That which is claimed is:

1. An apparatus comprising:

a vaporizer for vaporizing a liquid feed to a vaporized feed, the vaporizer comprising a vaporizer tank, having a lower portion and an upper portion, for containing the liquid feed in the lower portion and a heating means for heating the liquid feed to thereby produce vaporized feed in the upper portion;

a first outlet line in communication with the upper portion of the vaporizer tank;

a first valve associated with the first outlet line and having an open position and a closed position;

a steam active reformer feed conversion unit for receiving vaporized feed from the first valve in its open position, the feed conversion unit converting the vaporized feed to a desired product;

a second outlet line in communication with the upper portion of the vaporizer tank;

a second valve associated with the second outlet line and having an open position and a closed position;

a condenser comprising a cooling means and a condenser tank having a lower portion and an upper portion, the upper portion of the condenser tank receiving vaporized feed from the open second valve and condensed, liquid feed being collected in the lower portion of the condenser tank;

an inlet line for receiving from the lower portion of the condenser tank condensed, liquid feed which flows through the inlet line and into the vaporizer tank; and a third valve, having an open position and a closed position, associated with the inlet line which opens to the open position from a normally closed position when a predetermined level of condensed, liquid feed is reached in the lower portion of the condenser tank.

2. An apparatus as recited in claim 1 wherein the second valve is pressure controlled so that the second valve opens to the open position from a normally closed position after the first valve is closed to the closed position from the normally open position to cause an elevation of pressure in the upper portion of the vaporizer tank to a predetermined set point.

3. A method comprising:

(a) passing a flow of vaporized feed from a vaporizer tank and through an open first valve to a feed conversion unit which converts the vaporized feed to a desired product;

(b) after (a), closing the first valve to stop the flow of vaporized feed to the feed conversion unit;

(c) after (b), opening a normally closed second valve to allow passage of vaporized feed from the vaporizer tank, through the second valve, and to a condenser tank wherein the second valve is pressure controlled so that the second valve opens after the first valve closes in (b) to cause an elevation in pressure of the vaporized feed in the vaporizer tank to a predetermined pressure set point;

(d) condensing the vaporized feed in the condenser tank to condensed, liquid feed;

(e) passing the condensed, liquid feed from the condenser tank back into the vaporizer tank;

wherein condensed, liquid feed is accumulated in the condenser tank until it reaches a predetermined level, at which point a normally closed third valve opens to allow passage of condensed, liquid feed to the vaporizer tank in (e);

wherein the feed conversion unit in (a) is a steam active reformer; and wherein the feed is a paraffin and the desired product in (a) is an olefin or aromatic.

\* \* \* \* \*